I. JONES.
TUG FASTENER AND DETACHER.
APPLICATION FILED JULY 28, 1909.
964,648.
Patented July 19, 1910.
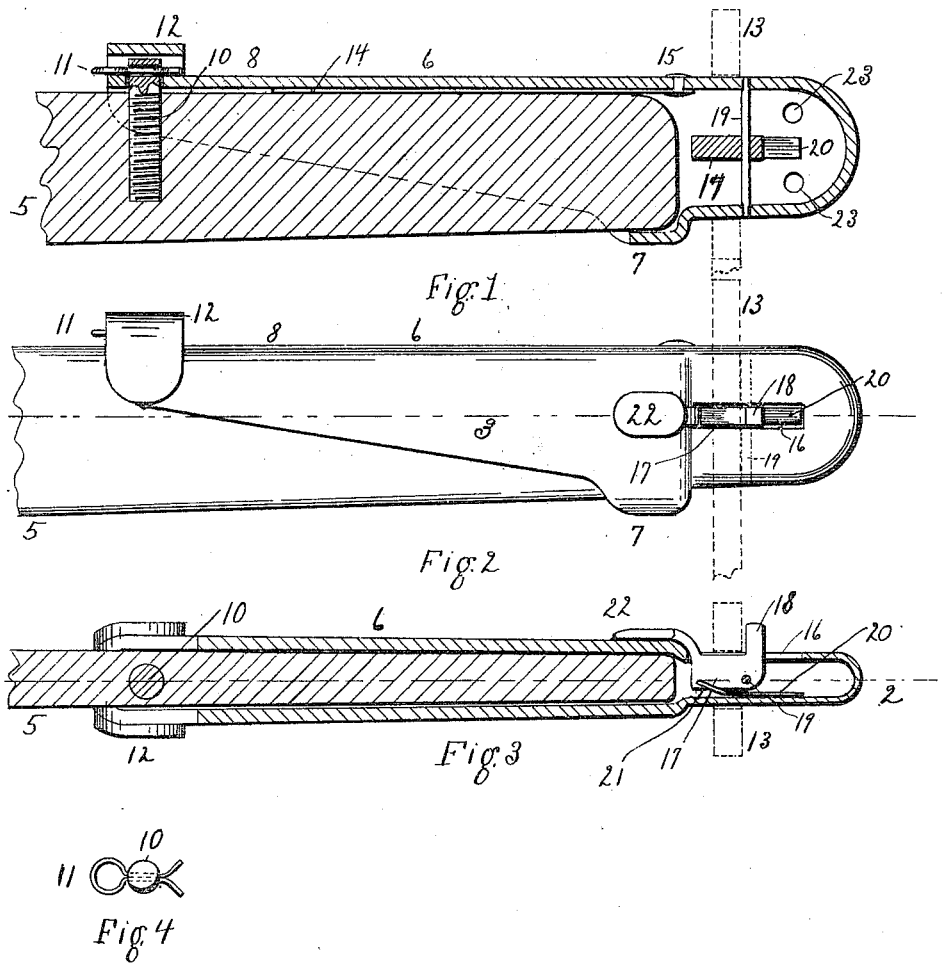

UNITED STATES PATENT OFFICE.

ISAAC JONES, OF TOPEKA, KANSAS.

TUG FASTENER AND DETACHER.

964,648.   Specification of Letters Patent.   Patented July 19, 1910.

Application filed July 28, 1909. Serial No. 510,080.

*To all whom it may concern:*

Be it known that I, ISAAC JONES, a citizen of the United States, residing in Topeka, in the county of Shawnee and State of Kansas, have invented new and useful Improvements in Tug Fasteners and Detachers, of which the following is a specification.

The general object of my invention is, first, to provide a simple and efficient means for the quick detachment of the tugs from the swingle-tree, as in cases of run-away and other emergencies; second, to provide a simple and efficient means for retaining the tug on the swingle-tree and for attaching it thereto and detaching it therefrom, in the ordinary hitching and unhitching of the horse; and third, to provide a combined quick detacher and tug fastener. And my invention consists of the parts, improvements, and combinations herein set forth and claimed.

In the drawings accompanying and forming part of this specification, and in the description of the drawings, I have shown my invention in its preferred form, and have shown what I deem to be the best mode of applying the principles thereof, but obvious changes in form, proportions, and materials, the transposition of parts, and the substitution of equivalent members may be resorted to, within the scope of the appended claims, without departing from the spirit of my invention.

Figure 1 is a sectional view, through the line 2 of Fig. 3, of my invention applied to the end of a swingle-tree; Fig. 2 is a plan view thereof. Fig. 3 is a sectional elevation through the line 3 of Fig. 2. And Fig. 4 is a top view of the stud and spring cotter for holding the device in place on the swingle-tree.

Similar reference characters indicate like or corresponding parts throughout the several views.

5 may represent the end of a swingle-tree.

6 is a casing adapted to fit over and embrace the end, the forward edge being short, as shown at 7, and the rear edge being rather long, as shown at 8.

10 is a stud secured to the swingle-tree at the inner end of the casing, as by screwing or bolting it, and 11 is a spring cotter pin passing through a hole in the stud on the outer side of the casing for holding the casing in place on the end of the swingle-tree.

12 is a shield turned over the end of the stud to conceal it and to prevent the horse's tail from catching under the pin.

13 is a dotted outline of the end of the tug which is attached to the swingle-tree.

14 is a spring secured at 15 and tending naturally to throw the inner end of the casing rearwardly and free from the stud.

It will be seen that the casing is held in place when the pull is on the tug by reason of the pressure of the rear edge against the end of the swingle-tree, the spring cotter pin preventing the casing from being pulled off. I contemplate securing a cord to the cotter pin, and making the pin of soft metal, so that by pulling the cord, the pin will be removed, thereby permitting the spring to throw the inner end of the casing backward and thus permitting the tug to pull the casing off of the end of the swingle-tree and thereby to free the horse from the swingle-tree.

In the outer end of the casing, and preferably in the upper face thereof, is a slot 16, in which is pivoted on a rod 19 an L-shaped lever or tug-clip 17 having an outwardly extending finger 18. A spring 20 is secured to the under side of the clip at 21 and tends to hold the clip in normal position and to return it thereto, and the clip may be provided with a thumb- or finger-piece 22 by which it may be manually operated.

23 23 are holes in the bottom of the casing to permit the dirt and dust which may accumulate therein to sift out.

To place the tug on the swingle-tree, simply raise the finger-piece 22 so as to depress the finger 18 into the slot 16, then apply the tug and release the clip, which will then hold the tug from coming off, as the tug will embrace the lever 17 in such a way as to prevent the finger from turning down and releasing the tug. To remove the tug, simply raise the finger-piece, which permits the tug to be slipped off.

What I claim is:

1. In a device of the kind described, the combination with a swingle-tree, of a casing fitted over the end thereof and adapted to hold a tug on its outer end, the front edge of the casing being short and the rear edge long, a stud secured to the swingle-tree at the inner end of the casing, a spring cotter pin extending through the stud on the outside of the casing, and a spring secured to the casing and tending naturally to throw the inner end of the casing rearwardly to free it from the stud, said casing bearing against the rear edge of the swingle-tree.

2. In a device of the kind described, the combination with a swingle-tree, of a casing fitted over the end thereof and extending inwardly from the end of the swingle-tree along the rear edge of the swingle-tree and bearing against said rear edge, a stud secured to the swingle-tree at the inner end of the casing, a spring cotter pin extending through the stud outside the casing, a spring for forcing the inner end of the casing free from the stud, said casing being provided with a slot in its outer end, and a pivoted spring-pressed L-shaped tug-retaining clip secured in the casing and extending through said slot.

In testimony whereof I have hereunto signed my name in the presence of witnesses.

ISAAC JONES.

Witnesses:
 JOHN A. HULIT,
 J. M. STARK.